United States Patent [19]
Gerber

[11] Patent Number: 5,875,038
[45] Date of Patent: Feb. 23, 1999

[54] FACSIMILE QUEUING AND TRANSMISSION SYSTEM

[75] Inventor: David J. Gerber, Hartford, Conn.

[73] Assignee: Gerber Scientific, Inc., South Windsor, Conn.

[21] Appl. No.: 653,795

[22] Filed: May 28, 1996

[51] Int. Cl.[6] .................................................. H04N 1/21
[52] U.S. Cl. ....................... 358/402; 358/407; 358/440; 358/468
[58] Field of Search ..................... 358/400, 402, 358/403, 404, 407, 440, 442, 468; 382/187

[56] References Cited

U.S. PATENT DOCUMENTS

| | | | |
|---|---|---|---|
| 3,604,846 | 9/1971 | Bohane et al. | 178/6.6 |
| 4,321,626 | 3/1982 | Wada | 358/263 |
| 4,400,737 | 8/1983 | Arai et al. | 358/263 |
| 4,614,978 | 9/1986 | Doster et al. | 358/263 |
| 4,623,936 | 11/1986 | Urban et al. | 358/284 |
| 4,670,791 | 6/1987 | Murata et al. | 358/441 |
| 4,941,170 | 7/1990 | Herbst | 358/440 |
| 5,048,109 | 9/1991 | Bloomberg et al. | 382/50 |
| 5,075,787 | 12/1991 | Shaughnessy et al. | 358/452 |
| 5,095,373 | 3/1992 | Hisano | 358/402 |
| 5,099,340 | 3/1992 | Kamada et al. | 358/402 |
| 5,126,858 | 6/1992 | Kurogane et al. | 358/450 |
| 5,131,053 | 7/1992 | Bernzott et al. | 382/9 |
| 5,138,465 | 8/1992 | Ng et al. | 358/153 |
| 5,235,651 | 8/1993 | Nafarieh | 382/46 |
| 5,247,591 | 9/1993 | Baran | 358/440 |
| 5,257,112 | 10/1993 | Okada | 358/402 |
| 5,272,764 | 12/1993 | Bloomberg et al. | 382/9 |
| 5,274,468 | 12/1993 | Ojha | 358/448 |
| 5,278,920 | 1/1994 | Bernzott et al. | 382/9 |
| 5,282,052 | 1/1994 | Johnson et al. | 358/402 |
| 5,291,592 | 3/1994 | Kita | 395/600 |
| 5,337,158 | 8/1994 | Okimoto et al. | 358/426 |
| 5,461,488 | 10/1995 | Witek | 358/402 |
| 5,465,167 | 11/1995 | Cooper et al. | 358/468 |
| 5,499,108 | 3/1996 | Cotte et al. | 358/400 |

*Primary Examiner*—Kim Yen Vu
*Attorney, Agent, or Firm*—McCormick, Paulding & Huber

[57] ABSTRACT

An apparatus for sequentially transmitting a plurality of multipage documents via a facsimile includes an optical scanner, an optical character recognition apparatus, and a feature recognizer apparatus. The present apparatus allows hands-free transmittal of several multipage documents by automatically determining from the document's cover sheet the values of operating parameters, such as the telephone numbers of destination facsimile machines and the number of pages in the document to transmit. Human intervention is not required to dial phone numbers or separate documents that are to be transmitted to different destinations. Moreover, the present apparatus allows for direct transmittal of copies to those persons indicated in the document to receive the same without the need to know the other recipients of the document.

13 Claims, 5 Drawing Sheets

FACSIMILE QUEUING AND TRANSMISSION SYSTEM

TECHNICAL FIELD

The present invention relates to facsimile machines in general and, more particularly, to facsimile machines which employ optical character recognition of the transmitted documents.

BACKGROUND OF THE INVENTION

Facsimile machines for transmitting the images of documents are well known in the art, with examples being disclosed in U.S. Pat. Nos. 3,604,846, 4,321,626, 4,400,737, 4,623,936 and 5,337,158, all of which are incorporated herein by reference. Generally, a facsimile machine transmits a document one page at a time The facsimile machine optically scans the document and converts the image(s) thereon into signals in digital form, usually referred to as a "bit map". These signals are prepared in a facsimile format and transmitted via a standard telephone line to a receiving facsimile machine. The receiving facsimile machine uses the received facsimile signals to reconstruct the original image and prints out a copy of this image.

Present facsimile machines operate much like a simple telephone. The user that wishes to send a document uses the facsimile machine to first dial the number of the receiving facsimile machine and wait for the receiving facsimile machine to answer. The pages to be transmitted are then fed through the facsimile machine one at a time by a facsimile feeder and all pages are scanned and transmitted. Then, the telephone connection is terminated and the facsimile can be used again.

With present facsimile machines, difficulties are encountered in sending multiple documents to multiple facsimile machines. Since the phone number of the receiving facsimile machine must be entered manually at some time after the preceding document has been scanned, a person must be physically present when one document has finished being scanned and another document is to be sent. This person must then present the new document to a facsimile feeder and enter the telephone number of the document's destination. If, for example, two documents must be sent to different locations, the sending party must wait for the first document to be scanned before entering the destination phone number and presenting the second document to the facsimile machine. Valuable time is lost when many large documents are to be transmitted by the facsimile machine, e.g. in a department with many employees and few facsimile machines. Moreover, often a copy of the same document needs to be transmitted to several different locations. It is highly inefficient to send document copies to multiple locations by repeatedly scanning the same document for each copy.

It would be advantageous to have a facsimile machine which does not require human intervention for dialing phone numbers nor for associating different documents with destination phone numbers. It would also be advantageous to have a facsimile machine which simultaneously accepts multiple documents for transmittal, then transmits each separately to the appropriate destinations, without the need for human intervention in dialing phone numbers or associating different documents with different destination phone numbers. The present invention is drawn toward such a system.

SUMMARY OF THE INVENTION

An object of the present invention is to provide a system which transmits documents via facsimile which can automatically derive values of its operating parameters from information listed on a cover sheet of the document, rather than from direct human intervention.

A further object of the present invention is to provide a system which transmits documents via facsimile without the need for direct human intervention in dialing a phone number of the destination facsimile machine.

A further object of the present invention is to provide a system which transmits multiple documents to multiple destination facsimile machines without the need for direct human intervention by detecting specified features within the documents. Features are prescribed arrangements of characters and graphics which define values of the facsimile machine's operating parameters.

A further object of the present invention is to provide a system which transmits multiple documents to multiple destinations via facsimile without the need for direct human intervention in dialing the phone numbers of each of the destination facsimile machines.

A further object of the present invention is to provide a system which senses from features on the document the beginning and end of a multipage document which is to be transmitted via facsimile.

A further object of the present invention is to provide a system which can limit the transmission of documents to prescribed destinations as well as limit the contents of the resulting transmitted documents as to the identity of those receiving a "blind copy", wherein a blind copy is a copy of a document which does not contain information about the identities of other recipients of the document.

A further object of the present invention is to provide a system which associates different documents which are to be transmitted via facsimile with a different destination facsimile machine.

According to the present invention, an apparatus for electronically transmitting a multipage document having at least one page to a remote document receiving apparatus, the page having thereupon an image comprising characters and graphics, the page further having a feature corresponding to a prescribed arrangement of characters and graphics, the feature defining a value of an apparatus operating parameter such as a remote document receiving apparatus telephone number and a number of pages in the multipage document, the apparatus comprises an optical scanner for receiving the page and for generating scanner signals indicative of the image upon the page, an optical character recognition apparatus, a feature recognition apparatus, a telephone interface, a document loader, and a controller. The optical character recognition apparatus receives the scanner signals and generates in dependence thereupon character signals which are indicative of the characters and graphics of the image and which are further indicative of positions on the page of the characters and graphics of the image. The feature recognition apparatus receives a subset of the character signals which are indicative of the feature and generates signals indicative of the value of the apparatus operating parameter in accordance therewith. The telephone interface generates signals to electronically connect to the remote document receiving apparatus and to present signals indicative of the multipage document thereto in response to telephone interface control signals. The document loader selectively presents the page into the optical scanner in response to document control signals. The controller generates the document control signals to selectively present the multipage document to the optical scanner and generates the telephone interface control signals to electronically connect to the remote document receiving apparatus and to present signals indicative of the multipage document to the remote document receiving apparatus in dependence on values of the signals indicative of the value of the apparatus operating parameter.

According to another aspect of the present invention, an apparatus of the foregoing type further comprises a destination recognizer apparatus for receiving the character signals and for generating therefrom telephone number signals which are indicative of a telephone number of the remote document receiving apparatus.

According to another aspect of the present invention, an apparatus of the foregoing type further comprises a document size recognition apparatus for receiving the character signals and generating therefrom document size signals indicative of a number of pages in the document.

DESCRIPTION OF THE PREFERRED EMBODIMENT

Figure 1:
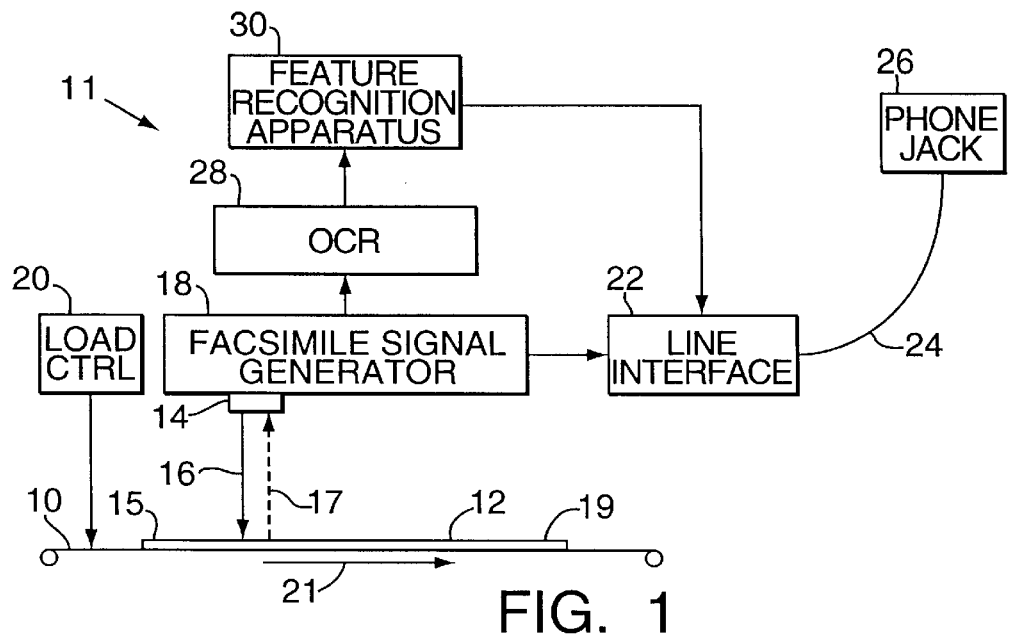
FIG. 1 is a simplified schematic illustration of a facsimile system provided in accordance with the present invention which determines values of operating parameters from features listed on a cover sheet.

In FIG. 1 there is shown a simplified schematic illustration of a facsimile queuing and transmission system 11 provided in accordance with the present invention. The system 11 determines its operating parameters from images (not shown) on a cover sheet 12 of a multipage document (not shown). A facsimile loading bed 10, controlled by a loading controller 20 in accordance with a prescribed process, loads the cover sheet from a document feeder (not shown) into position under a scanner beam 16 generated by an optical scanner 14, such as a line scanner.

The system 11 begins scanning when the cover sheet is received by the document feeder and the scanner moves to a first end 15 of the cover sheet. In the preferred embodiment, the scanner emits the scanner beam onto a portion of the cover sheet which is directly below the scanner. By optical reflection off an image which is upon the portion of the cover sheet which is directly below the scanner, a reflected beam 17 is presented to photosensitive electrical elements (not shown) in the scanner. The scanner generates scanner signals (not shown) in dependence on the reflected scanner beam. The scanner signals are indicative of the image which is upon the portion of the cover sheet which is directly below the scanner, and the image which is upon the portion of the cover sheet which is directly below the scanner is known as a scan line. A scanning width (not shown) is established by the width of the scan line along a scanning direction 21 of the scanner relative to the sheet.

The scanner advances relative to the cover sheet in the scanning direction 21 towards a second end 19 of the cover sheet. The distance which the scanner moves in the scanning direction from a scan line to a next scan line is referred to as a scanning increment. In order for the system 11 to scan an entire image upon the cover sheet, the scanning increment is no greater than the scanning width. It is preferred that the scanning increment is less than the scanning width, so that a portion of the image upon the cover sheet is scanned by two consecutive scanning operations, thereby reducing the possibility that any portion of the image will not be scanned by the optical scanner.

Once the optical scanner moves a scanning increment in the scanning direction, the optical scanner generates scanner signals indicative of the portion of the image that is directly below the scanner, as described hereinabove. The scanner continues in the scanning direction, generating scanner signals indicative of other portions of the image until the optical scanner scans the entire image.

The optical scanner presents the scanner signals indicative of the image upon the cover sheet to a facsimile signal generator 18. The facsimile signal generator converts the scanner signals received from the optical scanner device into facsimile signals which are indicative of the images upon the cover sheet. In the preferred embodiment, reproduced images are black and white with no shades of gray, and the facsimile signals are indicative of the set of (x,y) coordinates of all points in the image that are black. For example, upon scanning an image that is completely blank (white) except for only two dots (black points) thereupon, the facsimile signal generator generates facsimile signals indicative of at least four numbers. The first two numbers represent the X and Y coordinates of one dot in the image and the last two numbers represent the X and Y coordinates of the other dot in the image.

The facsimile signals are transmitted to a telephone line interface 22. The telephone line interface dials a telephone number of a destination facsimile machine (not shown), converts the received facsimile signals into equivalent telephone line signals and then transmits the telephone line signals along a telephone line 24 to a telephone outlet jack 26 and ultimately to the destination facsimile machine.

An optical character recognition (OCR) apparatus 28 receives the facsimile signals from the facsimile signal generator and generates therefrom character signals indicative of characters and graphics on the cover sheet and their positions on the cover sheet. Basic OCR technology is disclosed in U.S. Pat. Nos. 5,131,053, 5,235,651 and 5,278,920, and incorporated herein by reference. A combination of character feature detection and character template matching is utilized by the OCR apparatus in recognizing characters embedded within the scanned image data signals, and in thereafter generating character signals. The OCR apparatus recognizes a prescribed arrangement of dots in an image which constitutes a distinctive character or shape. For example, recognizing the character "A" involves, discerning two lines of dots that meet at the endpoints of the lines and a third line of dots crossing the first two lines through their midpoints. Similarly, recognizing a bar code involves recognizing a prescribed number of rows of dots which form a bar.

The character signals generated by the OCR apparatus are transmitted to a feature recognition apparatus 30 which determines therefrom a feature, defined as a prescribed arrangement of characters and graphics which describes a desired value of an operating parameter of the facsimile machine. Features are used to set the operating parameters in accordance with the desired value described on the cover sheet. For example, three such operating parameters that can be described by features on a cover sheet are (1) destination telephone numbers, (2) number of pages in a document to be transmitted and (3) destination telephone numbers of blind copy recipients, wherein a blind copy is a copy of the document to be transmitted which does not contain information about the identities of other recipients of the document, and wherein blind copy recipients receive a copy of the document which does not contain information about the identities of other recipients of the document. Multiple feature recognition apparatuses are used if multiple features on a cover sheet are intended to describe multiple desired values of operating parameters. For example, a cover sheet can contain destination telephone numbers in addition to the number of pages in the document.

Though a feature recognition apparatus determines a feature from character signals and sets an operating parameter in accordance with the feature, the feature recognition apparatus can be disabled, preferably through keypad input by the operator. The operating parameter would then be manually set by the user. For example, the user can disable a destination recognition apparatus and manually enter a telephone number of a destination facsimile machine to receive the transmitted document.

A feature recognition apparatus is configured to identify a type of feature. For example, a feature recognition apparatus that scans for a telephone number or numbers of a destination facsimile machine to receive a transmitted document is a destination recognition apparatus. A feature recognition apparatus that scans for a number of pages in a document is a document size recognition apparatus. A feature recognition apparatus that scans for a telephone number of a recipient of a blind copy is a blind copy recognition apparatus. Configurations of feature recognition apparatus are described hereinbelow in embodiments of the present invention and are exemplary of parameters utilized by the present invention.

Two methods by which a feature recognition apparatus recognizes features are described hereinbelow. The first is by finding features at prescribed locations on a cover sheet. The second is by recognizing prescribed patterns of characters and graphics, called tags, which indicate that a feature follows the tag.

Figure 3:
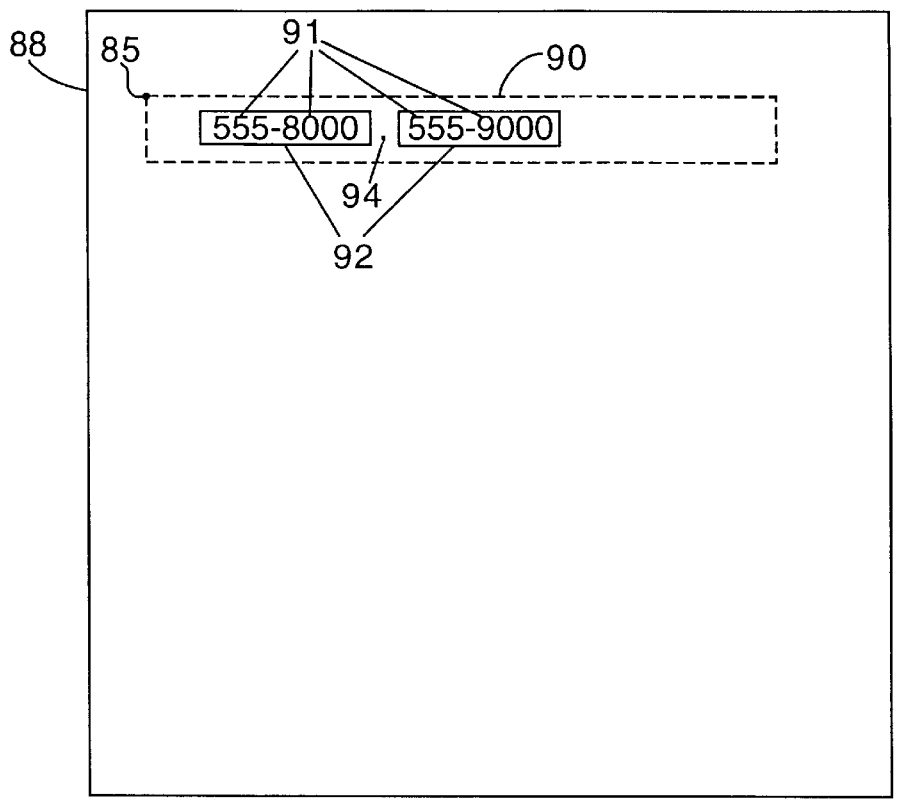
FIG. 3 is an example of a cover sheet upon which destination telephone numbers are located at prescribed locations.

In the preferred embodiment, a feature recognition apparatus determines features by scanned characters and graphics at a prescribed location on the cover sheet. For example, as shown in FIG. 3, a point 85 indicates a top-left corner of a bounding rectangle 90 on a cover sheet 88 within which all characters 91 constituting a feature 92 must reside. Multiple features within the bounding rectangle are separated, for example, by a comma 94.

Figure 6:
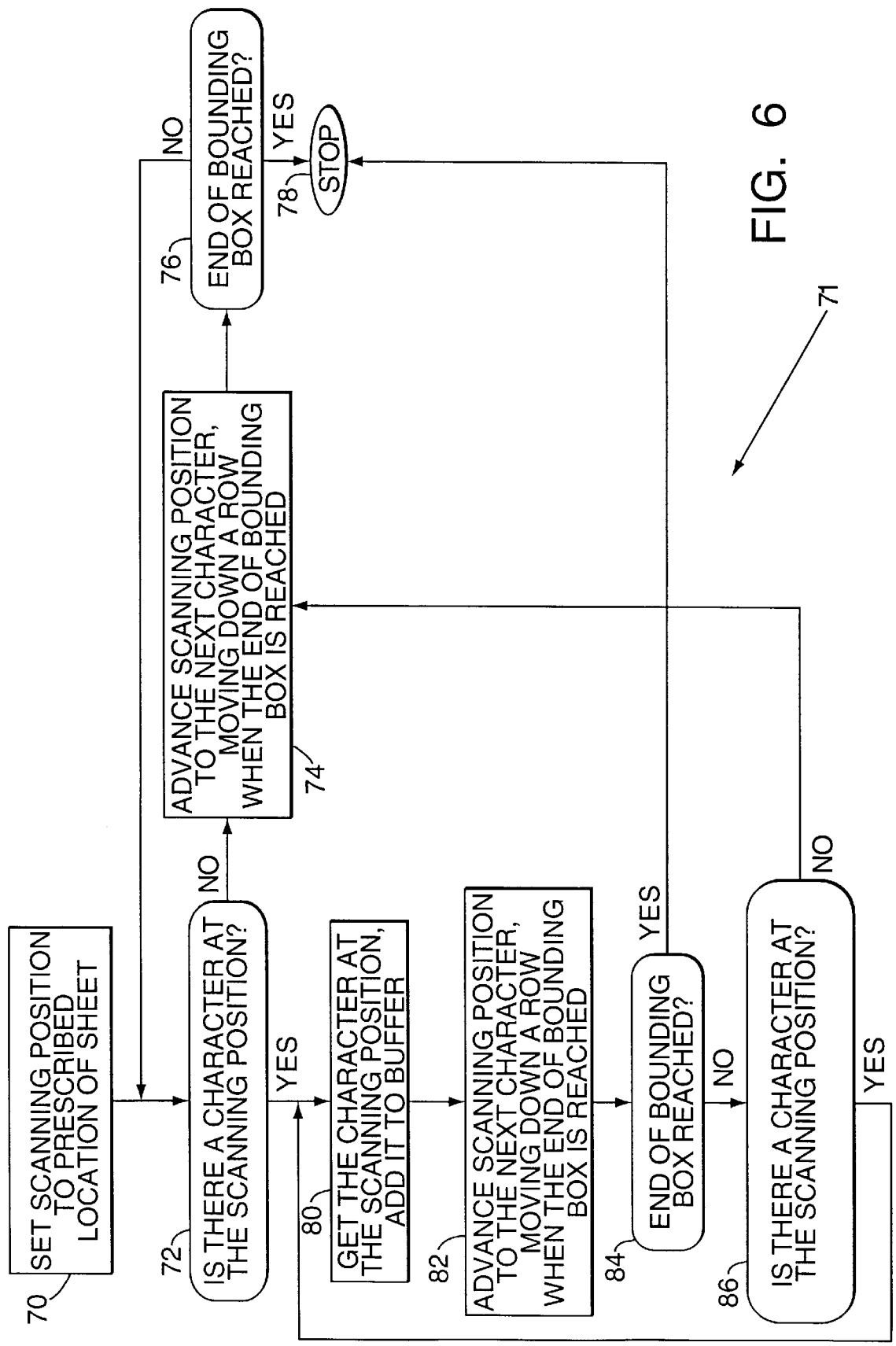
FIG. 6 is a flow chart illustrating a process provided in accordance with the present invention for feature recognition.

The flow chart of FIG. 6 describes a process 71 of feature recognition by detecting a prescribed string of characters at a prescribed location. As shown in step 70, a scanning position is set to a prescribed location, such as a top-left corner of the bounding rectangle that describes an area in which a feature must be located. As shown in step 72, if there is a character at the scanning position, then the character is added to a buffer resident in the feature recognition apparatus that is used to represent the feature, as shown in step 80. If there is not a character at the scanning position, then as shown in step 74 the scanning position is advanced to the following position, wrapping around to the next row if the end of a line is reached within the bounding rectangle. If, as shown in step 76, in advancing the scanning position the end of the area that must contain the feature is reached, then the feature recognition process 71 is halted, as shown in step 78.

After a character has been scanned and added to the buffer, the scanning position is advanced, as shown in step 82. Again, the scanning position wraps around to the next row if the end of a line is reached. If, as shown in step 84, in advancing the scanning position an end of the area that must contain the feature is reached, then the feature recognition process is halted, as shown in step 78. Otherwise, as shown in step 86, if there is a character at the scanning position, then it is also added to the buffer that is used to represent the feature, as shown in step 80.

The process depicted in FIG. 6 therefore recognizes a group of characters indicative of a feature at a prescribed location and stores the group of characters in a buffer of the feature recognition apparatus for later use. This prescribed location can be altered, preferably through keypad input by the operator, allowing the present invention to be tailored to fit pre-existing cover sheets which the user prefers to utilize.

Figure 7:
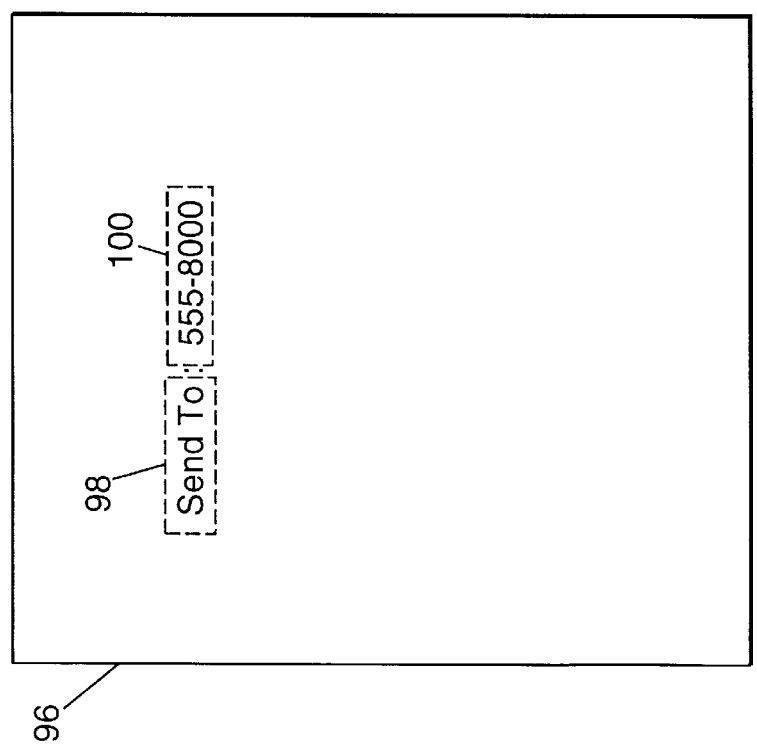
FIG. 7 is an example of a cover sheet upon which a destination telephone number follows a destination tag.

The present feature recognition apparatus can also determine features by scanning the character signals for signals indicative of prescribed patterns of characters and graphics, called tags. FIG. 7 illustrates a cover sheet 96 upon which there is a tag 98 which indicates that a feature 100 follows to the right of the tag. The prescribed patterns of characters and graphics defining a tag can be altered, preferably through keypad input, allowing the invention to be tailored to fit preexisting cover sheets which the user prefers to utilize.

Figure 5:
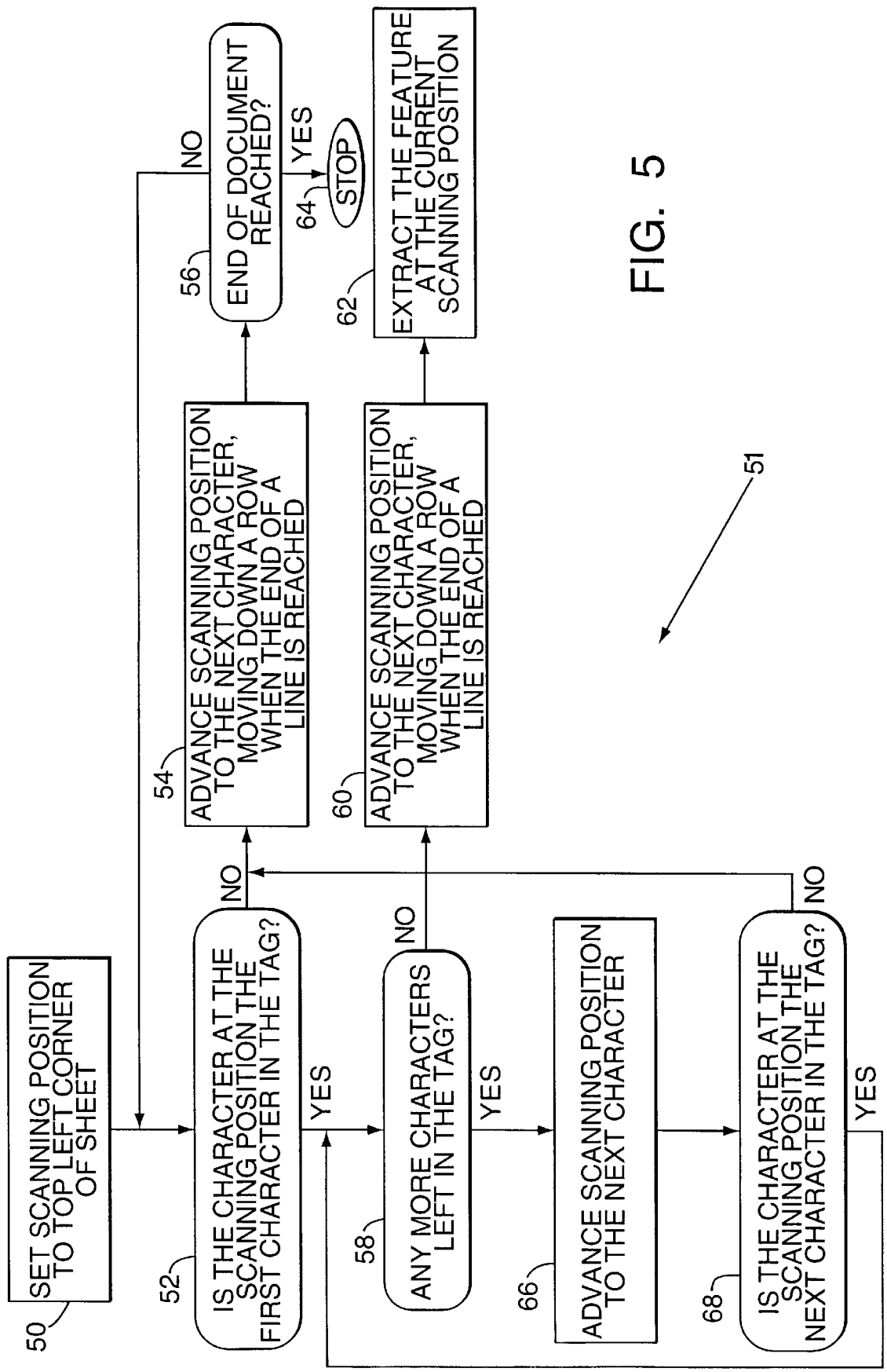
FIG. 5 is a flow chart illustrating a process provided in accordance with the present invention for feature recognition by recognizing a prescribed field or pattern of characters called a tag which indicates that an intended feature follows the tag.

FIG. 5 illustrates a process 51 by which the feature recognition apparatus 30 (FIG. 1) performs feature recognition by tag. Though the process of FIG. 5 illustrates recognition of a prescribed string of characters, the process is equally applicable to recognizing graphics, such as bar codes. The feature recognition apparatus scans the character signals by starting its scanning at characters in a top-left corner of the cover sheet, as shown in step 50. If a character at the scanning position is not a first character of the tag, as shown in step 52, then the feature recognition apparatus advances the scanning position to the right, scanning a next character, starting over at the first character in the next row if the right edge of the cover sheet is reached without finding a character, as shown in step 54. If the end of the document is reached (step 56), then the feature recognition apparatus stops processing the scanned data for tags, shown in step 64.

Once the first character of the tag is found, if there are more characters in the tag, as shown in step 58, then the feature recognition apparatus checks the character immediately to the right, as shown in step 66, if there is a character to the right within a prescribed minimum character separation distance. If there is a character to the right within the minimum separation distance, and the character is a second character in the tag, as shown in step 68, then the feature recognition apparatus continues scanning for subsequent characters immediately to the right of the found characters, as shown by repeating step 58, until either the entire tag is found, or the characters in the tag are not scanned in the prescribed sequence. If the feature recognition apparatus finishes scanning an entire tag, then the scanning position is advanced to the character to the right of the end of the tag, as shown by step 60, and the feature at that location is recognized and processed by the feature recognition apparatus as shown by step 62. The recognition of features has been described hereinabove.

Figure 2:
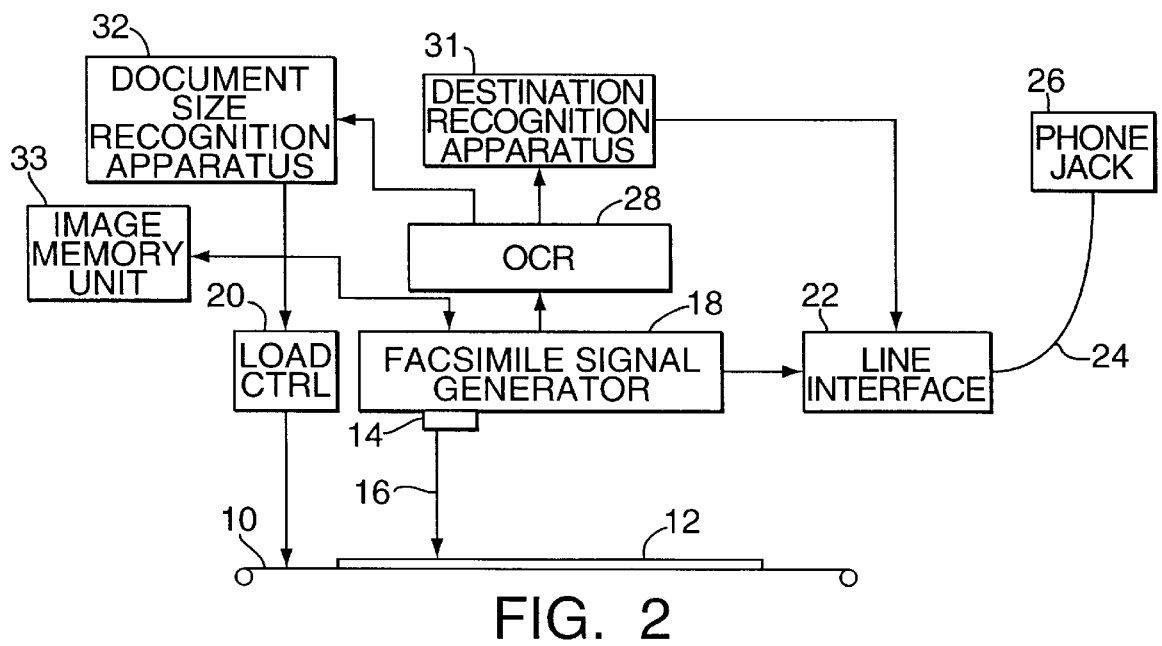
FIG. 2 is a simplified schematic illustration of a facsimile machine provided in accordance with the present invention which determines destination telephone numbers and a number of pages in a document from information listed on a cover sheet.

Turning now to FIG. 2, there is shown a system provided by the present invention which includes a destination recognition apparatus 31, a document size recognition apparatus 32, and an image memory unit 33. As described hereinabove, a destination recognition apparatus is a feature recognition apparatus that recognizes destination telephone numbers and a document size recognition apparatus is a feature recognition apparatus that scans for images indicative of the number of pages in the document. Thus, when a plurality of multipage documents are loaded into the facsimile machine, human intervention is not required to dial the destination telephone numbers of each document, nor is human intervention required to halt the facsimile machine when a document has finished being transmitted and a new destination telephone number is to be dialed. The multiple multipage documents need only be placed into a document feeder and the system provided in accordance with the present invention performs the appropriate dialing operations as described herein. In one embodiment, the feature which is indicative of the number of pages in the document represents an explicit number which is the number of pages in the document. In another embodiment, the feature which is indicative of the number of pages in the document represents an image upon the last page of a document, thus indicating that there are no more pages in the document. Thus, the system provided in accordance with the present invention implicitly determines the number of pages in the document.

Figure 8:
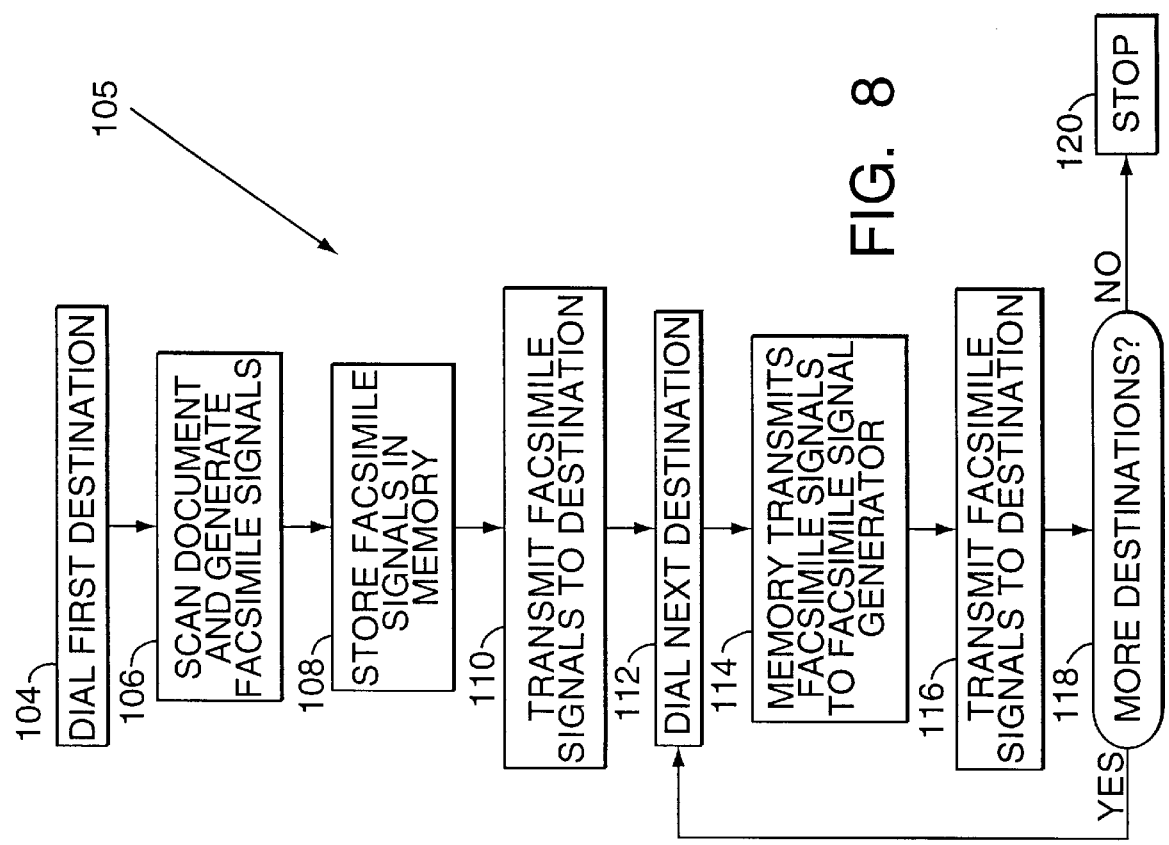
FIG. 8 is a flow chart illustrating a process provided in accordance with the present invention for storing facsimile signals for use in multiple recipient transmittals.

The image memory unit receives facsimile signals from the facsimile signal generator 18, and stores them for later retrieval by the facsimile signal generator, as shown by the process 105 illustrated in FIG. 8. Once the first destination telephone number is dialed, as shown in step 104, as each page of a multipage document is scanned, as shown in step 106, facsimile signals indicative of the image on a page are received by the image memory unit and stored, as shown in step 108, preferably as digital signals in RAM. Once the entire document has been scanned and transmitted to a destination facsimile machine, as described hereinabove and shown in step 110, the same document can be transmitted to multiple recipients without rescanning the document since the facsimile signals indicative of the document's contents have been stored in the image memory unit. When a document is to be transmitted to additional destination facsimile machines, the next destination telephone number is dialed, as shown in step 112, the image memory unit transmits the stored facsimile signals for each page subsequently to the facsimile signal generator, as shown in step 114, and the facsimile signal generator transmits the stored facsimile signals to the telephone line interface as described hereinabove and shown in step 116. If there are more destinations, as shown in step 118, the process is repeated. Otherwise the process stops, as shown in step 120.

The destination recognition apparatus and document size recognition apparatus receive character signals from the OCR apparatus 28. As described hereinabove and shown in 2, 3, 4 and 7 the destination recognition apparatus determines from the character signals destination telephone numbers and the document size recognition apparatus determines from the character signals the number of pages in the document (not shown). For example, the destination recognition apparatus can be configured to recognize destination telephone numbers by examining the character strings for tags such as "To:", "Send to", "Number-", or "Fax Number:". In the preferred embodiment, the document size recognition apparatus scans within a prescribed location for a feature which indicates the number of pages in the document. In another embodiment, the document size recognition apparatus scans for a graphic or character string which is indicative of an end of a document, such as the character string "END DOCUMENT". Similarly, in another embodiment the document size recognition apparatus scans for a graphic or character string which is indicative of a beginning of a next document, such as the character string "START DOCUMENT".

Once the destination recognition apparatus has determined the telephone number of the destination facsimile machine, the destination recognition apparatus transmits telephone number signals indicative of this telephone number to the telephone line interface, which dials the telephone number and transmits the facsimile signals along the telephone line, as described previously.

Once the document size recognition apparatus has determined the number of pages in the document, it transmits document size signals indicative of the number of pages in the document to the loading controller. The loading controller then loads the number of pages specified, one at a time, as during normal use of the facsimile machine. When the last page of the document has been transmitted, the loading controller completes the loading process, and the telephone line interface severs the connection to the receiving facsimile machine.

Thus, even if a stack of several documents is in the document feeder, transmittal of each document to its associated destination halts after the final page of the document is transmitted. The next page in the document feeder, which is part of the next document, will not be incorrectly transmitted along with the previous document to the previous destination.

Figure 4:
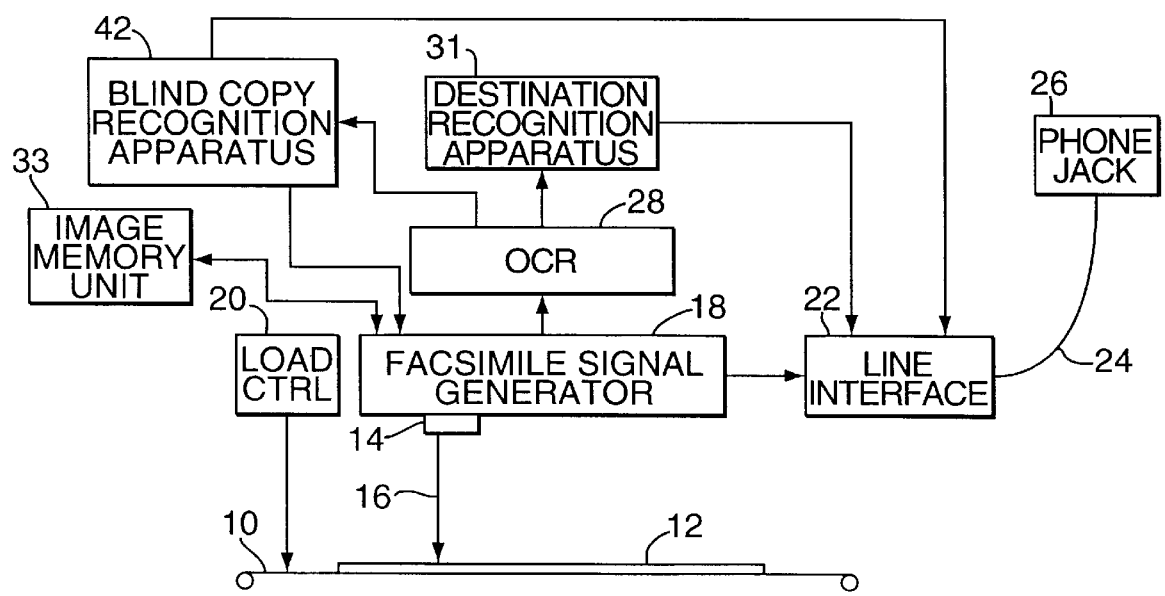
FIG. 4 is a simplified schematic illustration of a facsimile system provided in accordance with the present invention which provides for blind copy transmittal based on information listed on the cover sheet.

Turning now to FIG. 4, there is shown a system provided by the present invention which is substantially similar to that described hereinabove with respect to FIG. 3 and includes a destination recognition apparatus 31 and a blind copy recognition apparatus 42 which allows the transmittal of blind copies. As described hereinabove, a blind copy recognition apparatus is a feature recognition apparatus that recognizes destination telephone numbers of facsimile machines which are to receive blind copies.

The blind copy recognition apparatus receives character signals from the OCR apparatus 28, and therefrom determines telephone numbers of destination facsimile machines that are to receive blind copies. Feature recognition has been described hereinabove and shown in FIGS. 3, 5, 6, and 7. For example, the blind copy recognition apparatus can recognize destination telephone numbers by scanning for tags such as "Bcc" or "Blind Copy:". Once the blind copy recognition apparatus determines the telephone numbers of the destination facsimile machines that are to receive blind copies, the blind copy recognition apparatus transmits blind copy telephone signals to the telephone line interface, thus dialing the numbers of the facsimile machines to receive blind copies. This process of transmitting a document to multiple recipients is implemented as described hereinabove and shown in FIG. 8.

The blind copy recognition apparatus further transmits removal signals to the facsimile signal generator, causing the facsimile signal generator to generate a second set of facsimile signals which are indicative of the image on the cover sheet with the images and characters indicative of the blind copy recipients excluded therefrom. The second set of facsimile signals corresponds to the image on the cover sheet, except that the area containing the blind copy information is blank (white). Therefore, there are no black dots in that area, requiring that the second set of facsimile signals include no (x,y) coordinates of any points within that area. This second set of facsimile signals is transmitted to the telephone line interface for transmission across the telephone line, as described hereinabove.

Although, the invention has been shown and described with respect to a preferred embodiment thereof, it would be understood by those skilled in the art that other various changes, omissions and additions thereto may be made without departing from the spirit and scope of the present invention. For example, other types of features may be recognized from the cover sheet to describe values of different operating parameters. For example, the features may comprise bar code graphics to designate operating parameters. The features may be located on any other sheet besides the cover sheet in a multipage document. The cover sheet may also refer to the page number of a page in a multipage document from which another feature is to be recognized. Similarly, those skilled in the art will understand that control functions may be distributed throughout several subsystems, or centralized in a single subsystem.

What is claimed is:

1. An apparatus for electronically transmitting a multipage document having at least one page to a remote document receiving apparatus, the page having thereupon an image comprising characters and graphics, the page further having a feature corresponding to a prescribed arrangement of characters and graphics, the feature defining a value of an apparatus operating parameter, said apparatus operating parameter including a remote document receiving apparatus telephone number and a number of pages in the multipage document, said apparatus comprising:

optical scanner means for receiving the page and for generating scanner signals indicative of individual characters in the image upon the page;

optical character recognition means OCR for receiving said scanner signals and for generating in dependence thereupon character signals which are indicative of the characters and graphics of the image;

feature recognizer means including a destination recognizer means for receiving said character signals and generating therefrom telephone number signals which are indicative of a telephone number of the remote document receiving apparatus, and including a document size recognizer means for receiving said character signals and generating therefrom document size signals indicative of a number of pages in the document;

telephone interface means for generating signals to electronically connect to the remote document receiving apparatus and to present signals indicative of the multipage document thereto in response to telephone interface control signals;

document loading means for selectively presenting the page into said optical scanner means in response to document control signals; and a controller for generating said document control signals to selectively present the multipage document to said optical scanner means and for generating said telephone interface control signals to electronically connect to the remote document receiving apparatus and to present signals indicative of the multipage document to the remote document receiving apparatus in dependence on values of said signals indicative of the value of the apparatus operating parameter including the telephone number signal indicative of a telephone number of the remote document receiving apparatus, and the document size signal indicative of a number of pages in the document and, the value of the apparatus operating parameter being determined by a shape and sequence of scanned characters and graphics, whereby the value of the apparatus operating parameter is independent of the absolute position or precise coordinates of the character and graphics on a page of a document.

2. The apparatus of claim 1 wherein said feature recognizer means generates character signals in dependence on the feature, which feature is defined by a character at a select position within the image.

3. The apparatus of claim 1 wherein said feature further includes a tag comprising characters arranged so as to form a prescribed character string, and wherein said feature recognizer means generates character signals indicative of the value of the apparatus operating parameter in dependence on at least one character which is at a prescribed position relative to a position of said tag.

4. The apparatus of claim 3 wherein said controller further comprises a means for generating tag configuration signals for presentation to said feature recognizer means for changing at least one of said characters in said prescribed character string.

5. The apparatus of claim 1 wherein said controller comprises loading controller means responsive to document size signals which are indicative of a number of pages in the multipage document.

6. The apparatus of claim 1 wherein said feature recognizer means is disabled upon receiving disable signals.

7. The apparatus of claim 1 further comprising a facsimile signal generator means for converting said scanner signals received from said optical scanner means into signals indicative of said image in facsimile format.

8. The apparatus of claim 1 wherein said feature recognizer means comprises a blind copy recognizer means for receiving said character signals, for generating therefrom blind copy telephone number signals indicative of a telephone number of the remote document receiving apparatus which is to receive a blind copy, and further includes a blind copy destination removal apparatus for generating facsimile signals which are indicative of said image from which said telephone number of the remote document receiving apparatus which is to receive a blind copy is excluded.

9. The apparatus of claim 8 further comprising image memory means for storing said scanner signals and for presenting said stored scanner signals to said telephone interface means in response to command signals from said controller.

10. The apparatus of claim 2 wherein said controller further comprises means for generating position configuration signals for presentation to said feature recognizer means for changing said select position from a first to a second image location.

11. The apparatus of claim 1 wherein said feature recognizer means comprises a document size recognizer means for receiving said character signals and generating therefrom document size signals indicative of a last page in the document.

12. The apparatus of claim 1 wherein said feature recognizer means generates character signals in dependence on a feature defined by graphics at a select position within said image.

13. The apparatus of claim 1 wherein said feature further includes a tag comprised of graphics arranged so as to form a prescribed graphics arrangement, and wherein said feature recognizer means generates character signals in dependence on an arrangement of graphics which is at prescribed position relative to the position, of a tag.

* * * * *